United States Patent
Toncelli

(10) Patent No.: US 12,473,233 B2
(45) Date of Patent: Nov. 18, 2025

(54) ARTICLE MADE OF CONGLOMERATE MATERIAL AND METHOD FOR MANUFACTURING SUCH ARTICLE

(71) Applicant: Luca Toncelli, Bassano del Grappa (IT)

(72) Inventor: Luca Toncelli, Bassano del Grappa (IT)

( * ) Notice: Subject to any disclaimer, the term of this patent is extended or adjusted under 35 U.S.C. 154(b) by 465 days.

(21) Appl. No.: 17/772,230

(22) PCT Filed: Nov. 3, 2020

(86) PCT No.: PCT/IB2020/060301
§ 371 (c)(1),
(2) Date: Apr. 27, 2022

(87) PCT Pub. No.: WO2021/090161
PCT Pub. Date: May 14, 2021

(65) Prior Publication Data
US 2022/0380256 A1  Dec. 1, 2022

(30) Foreign Application Priority Data
Nov. 8, 2019 (IT) .................. 102019000020666

(51) Int. Cl.
| | | |
|---|---|---|
| *B28B 1/30* | (2006.01) | |
| *C04B 20/00* | (2006.01) | |
| *C04B 28/26* | (2006.01) | |
| *C04B 41/45* | (2006.01) | |
| *C04B 41/51* | (2006.01) | |
| *C04B 41/69* | (2006.01) | |
| *B28B 1/087* | (2006.01) | |
| *C04B 103/30* | (2006.01) | |

(52) U.S. Cl.
CPC ............ *C04B 28/26* (2013.01); *B28B 1/30* (2013.01); *C04B 20/004* (2013.01); *C04B 41/4523* (2013.01); *C04B 41/5166* (2013.01); *C04B 41/69* (2013.01); *B28B 1/087* (2013.01); *C04B 2103/30* (2013.01); *C04B 2201/20* (2013.01)

(58) Field of Classification Search
CPC ........... B28B 1/30; B28B 1/087; C04B 28/26; C04B 20/004; C04B 41/4523; C04B 41/5166; C04B 2103/30
USPC ........................................................ 264/239
See application file for complete search history.

(56) References Cited

U.S. PATENT DOCUMENTS 5,492,660 A   2/1996   Vyletel et al.

FOREIGN PATENT DOCUMENTS

| CN | 1061935 A | 6/1992 | |
|---|---|---|---|
| CN | 101943309 A | 1/2011 | |
| EP | 3075714 A1 * | 10/2016 | ......... C03C 10/0018 |
| ES | 2645656 T3 | 12/2017 | |
| WO | 2020261204 A1 | 6/2020 | |

OTHER PUBLICATIONS

Brown, J., "Sodium silicate bonded sand," Foseco Ferrous Foundryman's Handbook (Jan. 1, 2000), pp. 205-215, 12 pages.
PCT International Search Report and Written Opinion dated Jan. 25, 2021 for International Application No. PCT/IB2020/060301, from which the instant application is based, 11 pages.

* cited by examiner

*Primary Examiner* — Christina A Johnson
*Assistant Examiner* — Xue H Liu
(74) *Attorney, Agent, or Firm* — Fredrikson & Byron, P.A.

(57) ABSTRACT

Article made of conglomerate material in the form of a slab including an aggregate which includes granules of expanded material having a selected particle size range and defining between them inter-granular cavities containing only air and no filling material. The aggregate also includes a binder present in a controlled minimum quantity sufficient for lining the granules of expanded material. The article also includes a lining layer integral with the aggregate. Also, a method for the production of an article made of conglomerate material.

9 Claims, No Drawings

ARTICLE MADE OF CONGLOMERATE MATERIAL AND METHOD FOR MANUFACTURING SUCH ARTICLE

RELATED APPLICATIONS

This application is a 35 U.S.C. 371 national stage filing from International Application No. PCT/IB2020/060301, filed Nov. 3, 2020, which claims priority to Italian Application No. 102019000020666, filed Nov. 8, 2019, the teachings of which are incorporated herein by reference.

The present invention relates to the production of articles made of conglomerate material and in particular the production of articles from a mix comprising granules of expanded material and a binder.

In particular these articles are in the form a slab and may have a particular decorative effect. The present invention also relates to a method for the production of articles made of conglomerate material.

For some time a method for the manufacture of compact and non-porous articles, preferably in slab form, known also as Bretonstone® technology, has been known, wherein an initial mix consisting of granular material with a selected particle size, a filler in powder form and a hardening binder is prepared.

Preferably the granular material is a stone material or inorganic stone-like material and the binder is chosen from the group comprising polyester, acrylic, epoxy, polyurethane and other resins.

The mix is deposited and distributed on a temporary support or in a mould and is subjected to a vacuum compression step, with the simultaneous application of a vibratory movement at a predetermined frequency.

Then a binder hardening step is performed, at the end of which the article has the desired mechanical characteristics. The resultant article, or slab, is then subjected to the successive finishing steps (sizing, smoothing, polishing and the like).

Alternatively or in addition, the mix may contain an expanded granular material, such as expanded glass and/or expanded clay, and/or a filler which is also composed of an expanded material. This latter composition helps reduce the specific weight of the finished article.

One drawback of this latter technical solution consists in the fact the expanded granular material allows only a limited reduction of the density of the articles, which therefore have a weight which is in any case significant. For example, the density of the articles thus made may be between 0.9 and 1.1 $kg/dm^3$.

This drawback is of particular significance in the furnishing and building sectors, where the articles must be handled in order to be positioned in their place of use.

A further drawback consists in the fact that the use of the filler, while improving the mechanical characteristics of the articles, makes the process for production of the articles more complex and costly.

Moreover, the articles of conglomerate material thus obtained may be combined with a cladding sheet or panel, these being made of a material which preferably is different from the material of the article.

In this configuration it is necessary for the article and the cladding panel to have similar thermal expansion coefficients, so as to avoid distortions associated with variations in temperature.

FIELD OF THE INVENTION

In order to overcome at least partially these drawbacks, processes for the manufacture of articles made of conglomerate material which use specific binders and which may be without fillers have been developed.

The production of an article made of conglomerate material comprising an aggregate which includes granules of expanded glass or expanded ceramic/clay and a binder consisting of an aqueous dispersion of sodium silicate or potassium silicate or colloidal silica is known from the Italian patent application 102019000010338.

BACKGROUND

The finished article is obtained following a binder and mix hardening process. The hardening may be realized by means of heating and consequent drying of the article in order to cause evaporation of the free water or by means of reaction of the aqueous dispersion with a weak acid.

The weak acid consists preferably of carbon dioxide which is introduced by means of blowing in situ and dissolved in the water of the dispersion; this second hardening procedure is also followed by a drying step for eliminating the water.

Moreover, the method of manufacturing the article of conglomerate material involves a step of heating the article to at least 650° C. with a suitable heating gradient so as to make it insoluble in water.

The article thus obtained has a lower density and is particularly light and easy to handle.

This article made of conglomerate material has a thermal expansion coefficient of between 4 and 7 $\mu m/m°$ C., which allows the joining together of the article with cladding panels made of material different from the conglomerate material, but having a thermal expansion coefficient similar to that of the article.

In particular, the cladding panel may be made of natural stone, sintered stone, ceramic material or coloured glass. In the case of a cladding panel made of ceramic material, the method for manufacturing such panel may involve four steps, which are known per se also for the production of tiles made of ceramic material and which are listed below:
 pressing a mix of moistened ceramic powder materials;
 drying the pressed ceramic materials;
 firing the pressed and dried ceramic materials in order to obtain the panel.

From the drying step an intermediate processing product, commonly referred to in the sector by the term "biscuit", is obtained; the biscuit is very fragile and therefore must undergo a subsequent firing step.

Moreover, the ceramic material cladding panel may have a visible lining layer designed to provide the panel and therefore the article made of conglomerate material together which the cladding panel is joined, with a particular aesthetic effect.

The panel lining layer may comprise a substrate consisting of a slip, optionally printed and decorated on the surface with inks for example by means of digital printing or plotter printing or spraying, and a protective substrate which comprises preferably vitreous glaze, referred to also as "frit", which is normally transparent.

The cladding panel thus made has a thickness generally of between 3 mm and 8 mm. However, these articles made of conglomerate material combined with cladding panels, preferably made of ceramic material, are not without drawbacks.

A first drawback consists in the fact that the manufacture of the cladding panel independently of the article results in an increase in the overall production time.

Another drawback consists in the fact that the joining together of the article of conglomerate material with a cladding panel further increases the overall production time.

Another drawback consists in the fact that the joining together of the article of conglomerate material with a cladding panel must be performed following the production of the article and in a different station of the processing plant; this results in a greater complexity of the plant for producing and processing the articles.

Another drawback consists in the fact that these articles made of conglomerate material combined with cladding panels are particularly costly.

BRIEF SUMMARIES OF OBJECTS OF THE INVENTION

One object of the present invention is to provide an article made of conglomerate material and a method for manufacturing it which are able to overcome the aforementioned drawbacks.

In particular, the main task of the present invention is that of providing an article made of conglomerate material which has a particular decorative effect without requiring separate steps for manufacturing a cladding panel or for joining the cladding panel together with the article.

Another task of the present invention is to provide an article made of conglomerate material which has a lower specific weight compared to the articles known in the sector and which has in any case a mechanical strength sufficient to allow it to be used in the architectural, furnishing and building sectors.

Another task of the present invention is to provide a method for the production of an article of conglomerate material which has shorter machining times.

A further task of the present invention is to provide a method for the production of an article of conglomerate material which allows the production of the article and the formation thereon of a lining layer to be completed in a single operation.

Another task of the present invention is to provide a method for the production of an article of conglomerate material which has reduced costs.

The aforementioned objects are achieved with a method for the production of the article according to Claim 1.

DETAILED DESCRIPTION OF EMBODIMENTS OF THE INVENTION

The article of the present invention is made of conglomerate material and has a porous and non-compact structure which helps reduce the specific weight thereof.

In the preferred embodiment of the present invention the article is in the form of a slab. Conveniently, the article in slab form is obtained from a mix deposited in a mould or on a temporary support. The mould or temporary support is of the type known per se from the prior art and will not be further described below. Subsequently the mix is compacted, preferably by means of vibro-compression.

The conglomerate material of the article comprises an aggregate of inert material which includes granules of expanded material, which are therefore light and have a selected particle size, and a binder.

The granules preferably consist of expanded glass and/or expanded ceramic/clay and are bonded together by means of a binder which may contain a plasticizing additive, as described in detail below.

Advantageously, interstitial cavities, referred to below as "inter-granular cavities", are formed between the granules, said cavities containing only air and being without filling material.

In fact, the article according to the present invention does not involve the use of a material, such as a paste containing a binder and a filler, for filling the inter-granular cavities, which represent 25-35% of the overall volume of the article.

Moreover, the presence of air inside the inter-granular granules provides the article with a limited heat conduction capacity and makes the article an effective heat insulant.

The granules of expanded glass and/or expanded ceramic/clay have a substantially impermeable surface and have inside them cavities which help lighten further the article and reduce the specific weight and heat conductivity thereof compared to the articles known in the sector.

Preferably, the granules made of expanded material have a particle size of between 0.1 and 8.00 mm and are non-permeable, spongy, spheroidal granules which have an average density of between 0.35 and 0.8 kg/dm$^3$. In the present description, the term "spongy" indicates an element having a porous and non-compact internal structure.

The granules may also have a particle size and density different from that described above, without thereby departing from the scope of protection of the present invention.

The binder is preferably an inorganic material, so as to achieve a predefined, linear, thermal expansion coefficient of the article, and the article is obtained by means of compaction, preferably by means of vibro-compression, and hardening of the binder by means of a production method described in detail in the continuation of the present description.

The binder is present in a controlled minimum quantity sufficient for lining the granules. This minimum quantity is such that the binder does not fill the inter-granular cavities, but preferably forms a layer at the interface between the granules.

In order to obtain this technical effect, the binder consists of a volumetric quantity ranging between 8% and 10% by volume of the total volume of the article.

As indicated above, the binder is an inorganic material; in particular, the binder is composed of an aqueous dispersion of sodium silicate which is mixed together with the granules of expanded material to form the mix.

As an alternative to sodium silicate, the binder may also be an aqueous dispersion of potassium silicate or also an aqueous dispersion of colloidal silica, although these substances form a binder which is less strong than that which can be obtained with sodium silicate, which therefore remains preferred.

The binder may also be formed by a mixture of aqueous dispersions of potassium silicate and/or colloidal silica with the aqueous dispersion of sodium silicate.

Moreover, the binder may optionally comprise a plasticizing agent in powder form, for example chosen from the group comprising metakaolin, kaolin and clays, bentonite or silica gel (colloidal silica), which are optionally mixed together.

In order to provide the article with the necessary consistency, the hardening of the binder and the mix may be obtained by means of drying of the compacted article with consequent evaporation of the free water.

The drying step is generally accelerated by heating the article up to 100° C. and also higher, for example up to 250° C.-300° C., with a predefined temperature gradient.

The accelerated drying process may require a few tens of minutes, or also hours, and is normally performed by placing the compacted article, not yet hardened, on a rigid drying surface.

Since the compacted, but not yet hardened article has a low mechanical strength, it must be handled with great care.

Alternatively, it is possible to achieve hardening of the binder and the mix in a few seconds without the need to remove the water by means of drying.

This other hardening process is realized by reacting the aqueous dispersion of sodium silicate which acts as a binder with a substance acting as a weak acid.

Preferably, the hardening of the binder is obtained by means of reaction of the sodium silicate with a weak acid formed preferably from carbon dioxide which is blown into and dissolved in the aqueous dispersion.

In this respect it is pointed out that the carbon dioxide reacting with the sodium silicate results in a compound consisting of sodium and/or silicon carbonate, which precipitates and causes solidification and hardening of the binder on the surface of the granules.

Therefore, the binder forms a layer at the interface between the granules of expanded material, but does not fill at all the inter-granular cavities.

In particular, the aqueous solution of carbon dioxide, which is formed when the carbon dioxide is dissolved in the water of the aqueous dispersion of sodium silicate, behaves in the manner of a weak acid in the reaction.

In fact, when the carbon dioxide is dissolved in water, carbon dioxide is formed and the pH of the aqueous solution is reduced owing to the dissociation of the $H+$ and $HCO_3-$ ions.

The carbon dioxide may be blown inside the inter-granular cavities creating a flow, in such a way that the carbon dioxide is dissolved in the water of the aqueous dispersion of sodium silicate.

Also the other classes of inorganic binders indicated above react with the carbon dioxide in the same way as the sodium silicate, resulting in a respective compound and thus resulting in hardening of the binder.

Moreover it has proved to be particularly advantageous to insert the already compacted slab resting on its forming support inside a chamber in which the air is extracted and a vacuum is formed.

In fact, after creation of the vacuum inside the chamber, the inter-granular cavities are practically air-free; at this point it is merely required to blow inside the chamber the carbon dioxide which spreads inside the inter-granular cavities and consequently dissolves in the water of the aqueous dispersion of the binder, resulting in accelerated hardening of the binder and the mix.

Advantageously, the process may also be performed more efficiently, for example by performing the vibro-compression of the mix in a vacuum environment in order to remove the air from the inter-granular cavities and then proceeding to blow the carbon dioxide directly into the vibro-compression chamber, without the need to transfer the article into a special chamber.

In this way, the article emerges from the compaction chamber compacted and, after evacuation of the residual carbon dioxide, already hardened and with a mechanical consistency such that it may be handled without difficulty.

In this embodiment also the article must be subsequently dried in order to eliminate the water contained inside it.

Even after elimination of the water the article is sufficiently hardened and firm, namely has a good mechanical strength, but it nevertheless has a poor resistance to the atmospheric agents such as moisture and water.

These atmospheric agents may cause a kind of regression of the hardening reaction, with consequent flaking of the article, namely of the hardened slab.

In order to consolidate the dried and hardened article and provide it with a good resistance against atmospheric agents it is preferable to heat the article up to a predetermined temperature, equal to at least about 650° C. and not higher than about 700° C.-750° C., so as to prevent the granules of expanded material from collapsing.

The article may be heated with a suitable heating gradient and then cooled with a suitable cooling gradient.

In particular the heating temperature and the consequent firing of the article is chosen with a value preferably close to 650° C.

The heating and the firing of the slab article may be used for both the hardening processes described above using furnaces known in the sector.

In particular, the heating step may involve a gradient which is not too rapid, preferably less than 20° C./minute, up to about 250° C.-300° C., in order to eliminate gradually the chemically bonded water still present in the mix and extract it completely.

This water is the residual water which has not been eliminated during the preceding heating step up to 100° C. and this latter step has the sole purpose of removing, by means of evaporation, the water which is still free.

As indicated above, the binder may optionally comprise a plasticizing agent in powder form, for example chosen from the group comprising metakaolin, kaolin and clays, and silica gel (colloidal silica). These plasticizing agents may be present in the binder singly or mixed together.

Moreover, these plasticizing agents, in addition to modifying the rheology and plasticity of the mix, may also cause reactions of the pozzolanic type which increase the strength of the inorganic binder following hardening.

The structure of the article described above results in a reduction in the density which may be advantageously comprised between 0.45 and 0.7 $kg/dm^3$ and therefore makes the article lighter than those known in the sector.

This advantage is particularly useful in the architectural, furnishing and building sector, in particular during the transportation, handling and use of the articles.

Advantageously, the composition of the binder may comprise further additives, for example colouring or anti-bacterial additives of the type known per se.

The configuration of the article described hitherto in the description is known, for example, from the Italian patent application No. 102019000010338.

In accordance with the present invention, the article comprises a lining layer integral with the aggregate of the article.

Preferably, the lining layer is thin, namely it has a thickness of between about 0.2 mm and 1 mm and preferably between 0.3 mm and 0.7 mm.

The term "integral" is understood as meaning a lining layer formed directly on the aggregate of granules of expanded material during the article manufacturing process, differently from the cladding panels of the prior art which are joined together with the article after the production of the latter.

The lining layer and the method of forming it on the article represent a technical advantage compared to the prior art.

In particular, the lining layer is intended to remain visible after the article has been laid in position and therefore may also have a decorative function in addition to one of use. Moreover, owing to the presence of the lining layer, it is possible to avoid the use not only of the cladding panels, but also of the adhesives which are normally used to join them together with the articles; the absence of the layers of adhesive helps lighten further the article. Preferably, the lining layer is a glass-based and/or ceramic/clay based enamel and comprises preferably at least one inner substrate consisting of a slip and at least one outer protective substrate.

Owing to this composition, the lining layer, in addition to having a decorative function, provides the article with a high resistance to wear and to the aggressive agents following use. The outer protective substrate is preferably formed by a glaze which may be transparent or coloured and therefore opaque.

Glazes, also known as "frits", consist of a particular type of amorphous vitreous material.

The inner substrate is integral with the aggregate of granules of expanded material, while the outer substrate, which is chemically bonded to the inner layer, is intended to remain visible following laying on-site of the article.

The slip substrate, as known from the prior art, is a clay-based layer which is applied directly to the aggregate of granules of expanded material and may be printed and decorated on the surface, before the application of a transparent glaze, with one or more suitable inks using known techniques, for example by means of digital printing or plotter printing or spraying, in order to realize various decorative motifs.

The decorative effect of the lining layer depends both on the colours of the inks used for printing and on the type of glaze used for the protective substrate.

The slip and glazes are normally formed by powders in an aqueous dispersion, so that they must be dried after application onto the article.

The lining layer is applied preferably onto the aggregate of the already dried article; moreover, the article may be smoothed beforehand and optionally rendered with a suitable inorganic stucco before application of the lining layer.

Alternatively, the drying of the slip and the glaze may be performed by means of the step, described above, of drying the article of conglomerate material.

The compositions of the inner slip substrate, of any inks and of the glaze of the protective substrate are selected so as to perform the firing thereof at a temperature sufficiently low and in any case less than the collapse limit of the article made of conglomerate material during the firing step; therefore this temperature must not be greater than about 700-750° C.

The compositions are selected so as to obtain, during firing of the article, a thermal expansion coefficient of the lining layer similar to the thermal expansion coefficient of the article.

In this way the formation of cracks known as "crackle glass" is avoided and the lining layer is fixed stably to the aggregate of granules of expanded material.

In particular, the glaze is of the low-melting type and has a melting temperature lower than the maximum heating temperature of the article provided during the firing step of the production process, namely about 700-750° C.

In order to obtain a lower melting temperature, the glaze may comprise for example a high lead or sodium and/or zinc content.

Moreover the inner slip layer and any inks have a particular structural and chemical composition which makes them suitable for being fired together with the glaze and the article so as to be chemically bonded together.

In this way it is possible to perform simultaneously the firing of the article made of conglomerate material and the lining layer.

In particular, the firing of the lining layer preferably involves melting of the glaze which is chemically bonded to the slip and/or to any inks, so as to create the protective outer substrate by means of a single heating and firing step in a single station of a plant, thus reducing the overall processing time.

In particular, the step of firing the protective substrate, together with melting of the glaze, may be performed in the same furnace used for heating and firing the article.

Alternatively, the steps of firing the article and the lining layer may also be performed separately, without thereby departing from the scope of protection of the present invention. Furthermore, it is possible to give the article a greater mechanical strength by applying a high-strength element to the side of the article opposite to the side on which the lining layer is formed, namely the rear side which is not visible following laying on-site of the finished article.

For example, the high-strength element may consist of a mesh or a fabric made for example of glass fibre or aramid fibre or carbon fibre applied to the article by means of a bonding resin.

Therefore, in this latter configuration, the article has on the front visible side the lining layer and on the rear side the high-strength element.

The invention also relates to a method for the production of articles made of conglomerate material in slab form and comprising an aggregate of the type described above.

In particular, the manufacturing method comprises the following steps:

preparation of an initial mix containing granules of expanded material and a binder;
deposition of the mix on a temporary support or mould;
compaction of the mix;
hardening of the binder and the mix so as to form the aggregate and obtain the article in slab form.

The binder is present in the mix in the minimum controlled quantity sufficient for lining of the granules of expanded material, leaving free the inter-granular cavities formed between the granules and containing only air; these cavities therefore do not contain any filling material, such as a filler.

Advantageously, the compaction step is performed by means of vibro-compression of the mix and the mould or the temporary support may have dimensions corresponding to those of the article to be obtained.

As described above, the binder used in the mix comprises an aqueous dispersion of sodium silicate or an aqueous dispersion of potassium silicate or an aqueous dispersion of colloidal silica, or mixtures thereof.

The binder may optionally comprise a plasticizing agent in powder form, for example chosen from the group comprising metakaolin, kaolin and clays, bentonite or silica gel (colloidal silica), which are optionally mixed together.

The binder and mix hardening step may be performed by means of evaporation of the water, which may be accelerated by means of heating with consequent drying of the article.

Alternatively, the hardening step may be realized by blowing carbon dioxide into the inter-granular cavities between the granules of expanded material with subsequent drying and elimination of the water, as already indicated above.

The carbon dioxide dissolved in the aqueous dispersion acts as a weak acid for forming a compound with the sodium silicate and accelerating the hardening of the binder and the mix. The method also involves a step of consolidation of the article by means of heating and consequent firing up to a predetermined temperature, equal to at least about 650° C. and not higher than about 700-750° C., with a suitable thermal gradient.

As indicated above, the gradient during heating may be about 20° C./minute up to 250° C.-300° C.

This step is performed downstream of the binder hardening and drying step and allows the chemically bonded residual water to be removed from the article and makes it water-resistant and moisture-resistant.

In accordance with the present invention, the method comprises a further step of applying a thin lining layer onto at least one surface of the aggregate of the article.

The application step is performed preferably after the step for compaction and drying of the article made of conglomerate material.

Before application of the lining layer, the article is preferably mechanically smoothed and optionally rendered with a suitable inorganic stucco.

Following the application step, the lining layer is integral with the aggregate of the article, namely it remains stably joined thereto.

As already mentioned above, with reference to the article, the lining layer may consist of a glass-based and/or ceramic/clay-based enamel.

In particular, the lining layer comprises at least one inner substrate consisting of a slip, optionally printed and decorated on the surface with suitable inks, and at least one protective outer substrate comprising a glaze.

In this connection the method may comprise a step of applying one or more inks by means of digital printing, plotter printing or spraying on the surface of the slip substrate so as to create various decorative effects.

The slip substrate, any inks, and the glaze are generally formed by powders in a liquid dispersion, so that they must be dried before firing.

Moreover, the materials forming the lining layer are suitable for being fired at temperatures lower than the limit firing temperature for the aggregate of the article.

In particular, the glaze of the protective substrate is of the low-melting type and is designed to melt at temperatures lower than the limit temperature which can be used during heating and firing of the article, equal at the most to about 700-750° C.

In order to obtain a lower melting temperature, the glaze may comprise in its composition a high lead or sodium and/or zinc content.

Moreover, it is possible to complete the production of the article with firing of the lining layer and the aggregate of the article during a single heating step and using a single furnace. Therefore, the firing of the lining layer and the aggregate of the article may be performed simultaneously during a single heating step.

Therefore, the step of heating and firing the article is also used to consolidate the article with the lining layer applied beforehand and make the lining layer integral with the aggregate of the article.

The step of applying the lining layer may also be performed after firing of the aggregate of the article; in this case a second step for firing the lining layer is provided, said step being performed after the step for firing the aggregate of the article.

The method for production of the article may be completed with various finishing steps different from each other and known from the state of the art, such as a step for lapping the lining layer.

From the above description it is now clear how the article made of conglomerate material and its manufacturing method are able to advantageously achieve the predefined objects.

In particular, it is clear how the formation of a thin lining layer integral with the article is able to provide an aesthetic effect without having to join the article together with a further cladding panel.

This feature is therefore able to reduce the manufacturing time, simplify the production plant and avoid an increase in the weight of the article.

Obviously, the above description of embodiments applying the innovative principles of the present invention is provided by way of example of these innovative principles and must therefore not be regarded as limiting the scope of protection claimed herein.

The invention claimed is:

1. A method for production of an article made of conglomerate material in the form of a slab and comprising an aggregate, the method comprising the following steps:
   preparation of an initial mix containing granules of expanded material and a binder, the granules of expanded material forming inter-granular cavities there between;
   deposition of said mix on a temporary support or in a mould;
   compaction of said mix;
   hardening of said binder and said mix so as to form the aggregate and obtain the article in slab form;
   wherein said binder is present in a minimum controlled volumetric quantity sufficient for lining the granules, the inter-granular cavities formed between said granules containing only air and being without filling material; and
   wherein the volumetric quantity of said binder is between 8% and 10% by volume of a total volume of the article;
   characterized in that the method comprises at least one step of applying a lining layer on at least one surface of said aggregate, said lining layer being integral with said aggregate after said at least one application step.

2. The method according to claim 1, characterized in that said granules of expanded material are granules of expanded glass and/or granules of expanded ceramic/clay.

3. The method according to claim 2, characterized in that said binder comprises an aqueous dispersion of sodium silicate or an aqueous dispersion of potassium silicate or an aqueous dispersion of colloidal silica, or mixtures thereof, the aqueous dispersion containing water.

4. The method according to claim 3, characterized in that said hardening step is performed by means of evaporation of the water, optionally accelerated by means of heating and consequent drying of the article.

5. The method according to claim 3, characterized in that said binder hardening step is performed by blowing carbon dioxide into the inter-granular cavities of the expanded material, with subsequent drying and elimination of the water.

6. The method according to claim 2, characterized in that said lining layer is a glass-based and/or ceramic-based and/or clay-based enamel, which is applied after a step for drying the article.

7. The method according to claim 4, characterized in that, downstream of said drying and hardening step, there is a step of heating and firing the article to a predetermined temperature suitable for consolidating the article with the lining layer.

8. The method according to claim 7, characterized in that said predetermined heating and firing step is less than about 700° C.-750° C.

9. The method according to claim 7, characterized in that firing of the lining layer and firing of the aggregate of the article are performed simultaneously in a single heating step.

* * * * *